(12) United States Patent
Poulin

(10) Patent No.: US 10,956,802 B2
(45) Date of Patent: Mar. 23, 2021

(54) SYSTEM AND METHOD FOR INVENTORY AND ORDER MANAGEMENT

(71) Applicant: LOGICIELS D'AUTOMATISATION MP INC., Quebec (CA)

(72) Inventor: Maurice Poulin, Quebec (CA)

(73) Assignee: LOGICIELS D'AUTOMATISATION MP INC., Quebec (CA)

( * ) Notice: Subject to any disclaimer, the term of this patent is extended or adjusted under 35 U.S.C. 154(b) by 0 days.

(21) Appl. No.: 16/648,755

(22) PCT Filed: Aug. 14, 2018

(86) PCT No.: PCT/CA2018/000150
§ 371 (c)(1),
(2) Date: Mar. 19, 2020

(87) PCT Pub. No.: WO2019/060981
PCT Pub. Date: Apr. 4, 2019

(65) Prior Publication Data
US 2020/0272877 A1    Aug. 27, 2020

Related U.S. Application Data

(60) Provisional application No. 62/563,265, filed on Sep. 26, 2017.

(51) Int. Cl.
*G06K 19/07* (2006.01)
*G06K 19/077* (2006.01)
(Continued)

(52) U.S. Cl.
CPC ... *G06K 19/07705* (2013.01); *G06K 7/10099* (2013.01); *G06K 7/1439* (2013.01); *G06Q 10/087* (2013.01)

(58) Field of Classification Search
CPC ......... G06K 19/07705; G06K 7/10099; G06K 7/1439; G06Q 10/087
(Continued)

(56) References Cited

U.S. PATENT DOCUMENTS 5,455,409 A   10/1995  Smith et al.
5,751,221 A    5/1998  Stanfield et al.
(Continued)

FOREIGN PATENT DOCUMENTS

WO  PCT/CA2018/000150    8/2018

OTHER PUBLICATIONS

WO PCT/CA2018/000150-ISR.
WO PCT/CA2018/000150-IPRP.

*Primary Examiner* — Daniel A Hess
(74) *Attorney, Agent, or Firm* — Agence de Brevets Fournier

(57) ABSTRACT

A system for managing a list of products in an inventory includes a plurality of addressable LEDs, each for positioning adjacent a product storing position that includes an identification code; at least one code reader; and at least one controller coupled to both the plurality of addressable LEDs and the at least one code reader for i) receiving from the code reader a command indicative of the list of products; and ii) as a result of the command, controlling the addressable LEDs so as to energize LEDs therefrom corresponding to the list of products. A method for managing the list of products further includes verifying an identity of each product from the list by reading and comparing the identification code thereof to the identification code associated to the corresponding addressable LED.

27 Claims, 3 Drawing Sheets

(51) Int. Cl.
*G06K 7/10* (2006.01)
*G06K 7/14* (2006.01)
*G06Q 10/08* (2012.01)

(58) Field of Classification Search
USPC .......................................................... 235/492
See application file for complete search history.

(56) References Cited

U.S. PATENT DOCUMENTS

| | | |
|---|---|---|
| 5,771,003 A | 6/1998 | Seymour |
| 6,592,028 B2 * | 7/2003 | Pires ...................... G06K 17/00 |
| | | 235/375 |
| 6,650,225 B2 | 11/2003 | Bastian, II et al. |
| 7,079,044 B1 | 7/2006 | Stanfield et al. |
| 7,202,785 B2 | 4/2007 | Maloney |
| 7,992,770 B2 | 8/2011 | Holley |
| 2007/0191983 A1 | 8/2007 | Griffits et al. |
| 2011/0304456 A1 * | 12/2011 | Zhu ......................... E05B 17/10 |
| | | 340/540 |
| 2014/0183269 A1 * | 7/2014 | Glaser ................... G06F 3/0346 |
| | | 235/492 |
| 2014/0210594 A1 * | 7/2014 | Zhu ......................... A47F 10/00 |
| | | 340/7.45 |
| 2014/0225491 A1 | 8/2014 | Shoenfeld |
| 2016/0307149 A1 | 10/2016 | Jones et al. |

\* cited by examiner

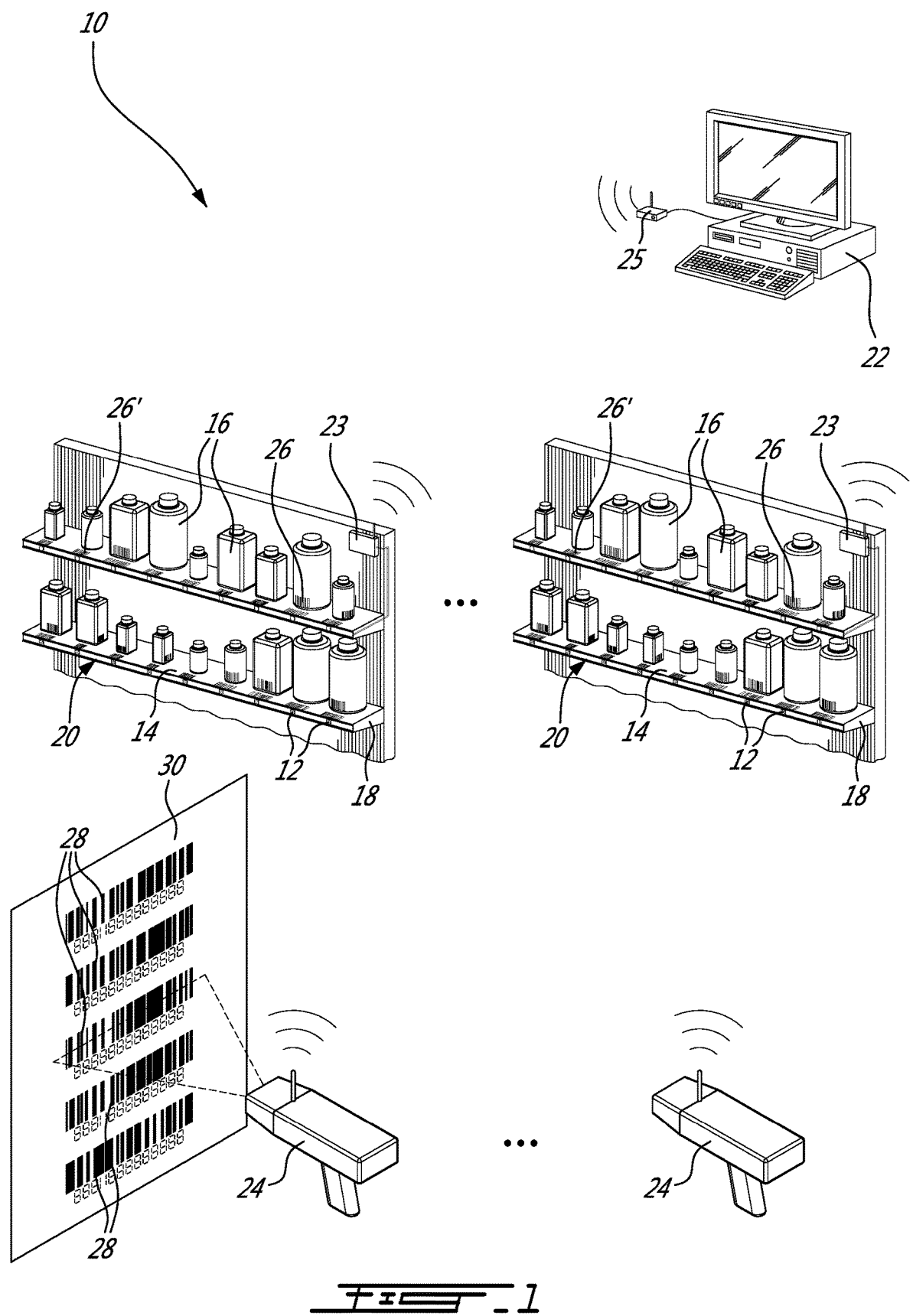

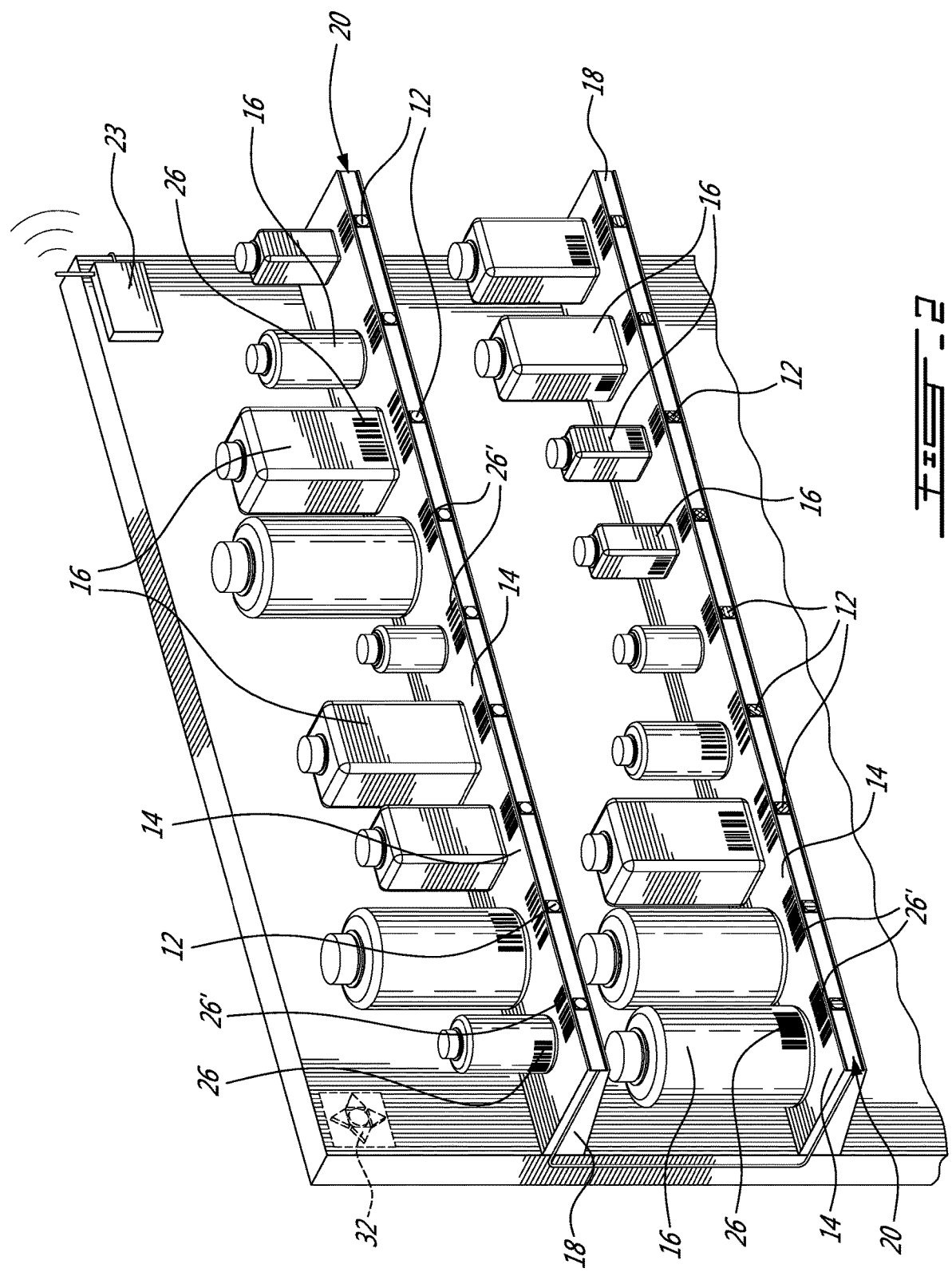

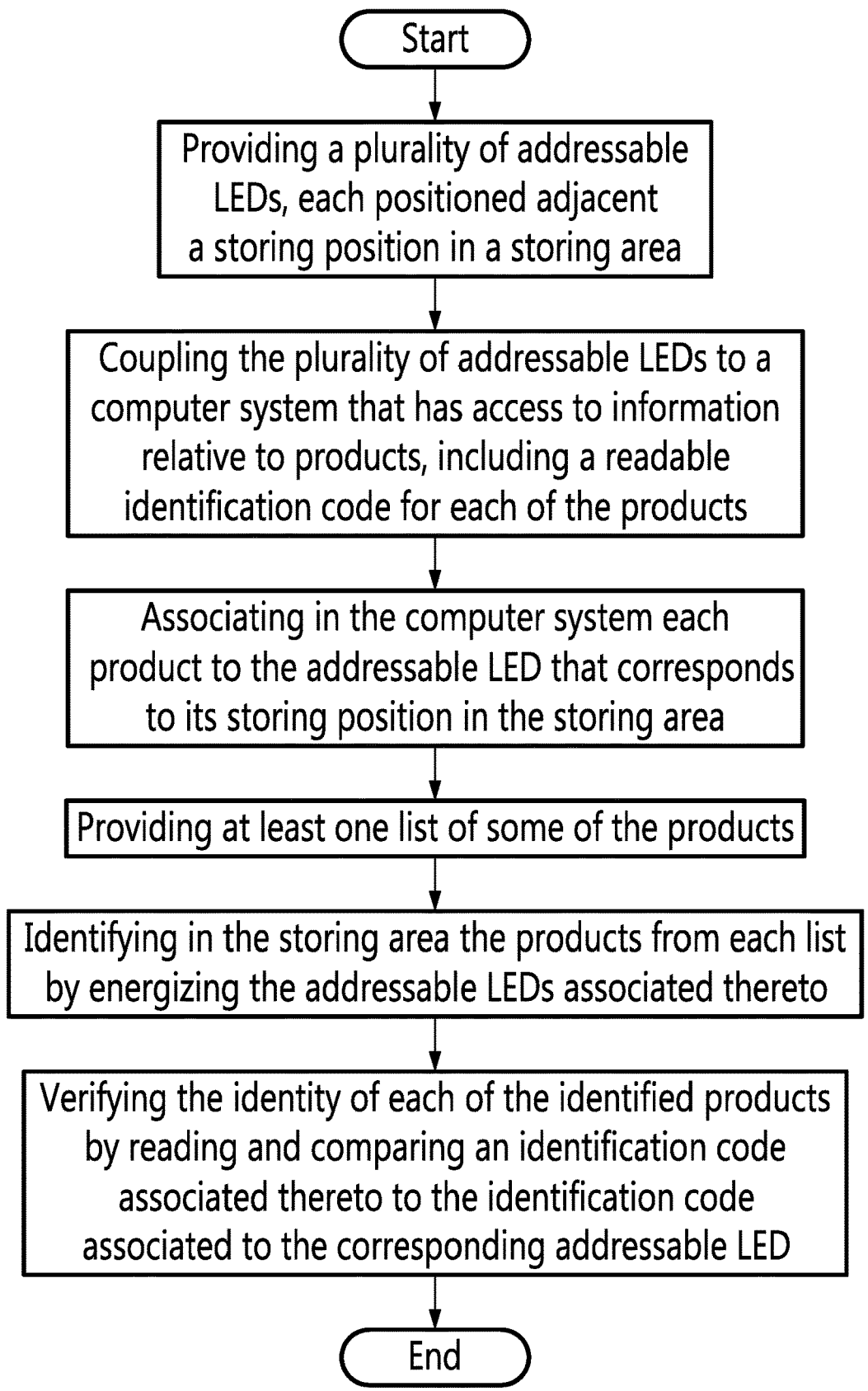

SYSTEM AND METHOD FOR INVENTORY AND ORDER MANAGEMENT

FOREIGN PRIORITY CLAIM

This is a 35 U.S.C. § 371 application of, and claims priority to, International Application No. PCT/CA2018/000150, which was filed on Aug. 14, 2018, and published as Publication No. WO 2019/060981A1, which claims priority to US Provisional Patent Application No. US 62/563,265, which was filed on Sep. 26, 2017, the entirety of all the applications are incorporated herein by reference.

BACKGROUND

Many computerized systems and methods are known to create and manage an inventory and products orders.

Such well-known methods include associating each product to an identifying code affixed thereto and tracking each product by associating the code to a location. The identifying code is typically in the form of a well-known bar code or a RFID (Radio Frequency Identification) code.

In such a system, the location of a product is tracked by scanning the product code at selected checkpoints, such as a warehouse entry, a carrier, a cash register, etc.

Such systems and methods have been adapted in product pick up, for example in the context of a product order.

In such systems, errors may still arise wherein a product has been originally misplaced in the storage and the wrong product is therefore picked up.

Systems are known that helps a user in identifying an item to pick after its selection.

For example, U.S. Pat. No. 7,992,770 B2, issued to Holley on Aug. 9, 2011 and titled "Spec-Trac" describes a computerized specimen rack storage system that is connected to a database server via a network and that stores barcoded specimens in a compartment adjacent unique LED (Light Emitting Diode). Each LED is associated to the adjacent product in the database so that its illumination helps found the product when it is to be picked up.

A drawback of the system by Holley is that there are no means provided to confirm that a product in a given compartment is the one selected for retrieval.

Also, the system is limited to a single user that needs to retrieve a single item at a time.

Griffits et al. describes an automated wine cellar in United States Pub. No. 2007/0191983 A1 published on Aug. 16, 2007 that, similarly to Holley, facilitates the location of objects (food items) within a storage. LEDs are positioned adjacent container receivers to help identifying a selected food item.

The system from Griffits et al. has drawbacks similar to Holley's.

A system and method free of the above-identified drawbacks is thus desirable.

SUMMARY

According to illustrative embodiments, there is provided a method for identifying a list of products in an inventory storing area, each product including an identification code, the method comprising:

providing a plurality of addressable LEDs (Light-Emitting Diode), each positioned adjacent a storing position in the storing area;

coupling the plurality of addressable LEDs to at least one controller that has access to information relative to the products, said information including the identification code for each of the products;

associating in the at least one controller each of the products in the inventory to one of the addressable LEDs; and identifying in the storing area products from the list by energizing the addressable LEDs associated thereto, resulting in a plurality of identified products.

According to further illustrative embodiments, there is provide a system for identifying a list of products in an inventory storing area, each product including a first identification code, the system comprising:

a plurality of addressable LEDs (Light-Emitting Diode), each having a unique address, and being for positioning adjacent a storing position in the storing area;

at least one code reader adapted for reading the identification codes;

at least one controller that is configured for performing the following tasks:

coupling to the plurality of addressable LEDs;

coupling to the at least one reader;

accessing information relative to the products; said information including the first identification code for each of the products and unique addresses of the addressable LEDs;

pairing each addressable LED to one of the products in the inventory;

allowing managing the list of products;

energizing the addressable LEDs associated to products from the list, resulting in a plurality of identified products in the storing area; and comparing a second identification code read by the code reader on a selected one of the identified products to the first identification code associated to the addressable LED corresponding thereto; whereby, the correct position of the selected one of the identified products in the storing area being confirmed by both the first and second identification codes being identical.

According to other illustrative embodiments, there is provided a system for managing a list of products in an inventory comprising:

a plurality of addressable LEDs, each for positioning adjacent a product storing position;

at least one code reader;

at least one controller coupled to both the plurality of addressable LEDs and the at least one code reader for i) receiving from the code reader a command indicative of the list of products in the form of a list code; and ii) as a result of the command, controlling the addressable LEDs so as to energize LEDs therefrom corresponding to the list of products.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

BRIEF DESCRIPTION OF THE DRAWINGS

In the appended drawings:

FIG. 1 is a schematic view of a system for inventory and order management according to an illustrative embodiment;

FIG. 2 is an isolated perspective view of shelves from FIG. 1, having products stored thereon and being provided with addressable LEDs secured to their front edge, each one registered to a unique product position on the shelves; and FIG. 3 is a flowchart illustrating a method for identifying a list of products in an inventory storing area according to an illustrative embodiment.

DETAILED DESCRIPTION

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, un-recited elements.

An illustrated embodiment of a system 10 for inventory and order management will now be described with reference to FIGS. 1 and 2.

The illustrated embodiment concerns the management of medication prescriptions and a medication inventory, for example in a pharmaceutical laboratory. The present method and system are however not limited to such an application. It is believed to be within the reach of a person skilled in the art to apply the present teaching to other fields of application, including without limitations the management of retail stores, warehouses, etc.

With reference to FIG. 1, a system for inventory and order management according to a first illustrative embodiment will now be described.

The system 10 comprises a main controller, in the form of a computer system 22, a plurality of addressable light-emitting diodes (LEDs) 12 that are coupled to the computer system 22, and a plurality of barcode scanners 24 also coupled to the computer 22.

Each LEDs 12 is registered with a storing position 14 for a product 16 on shelves 18 in an inventory storing area 15.

It is to be noted that while the products 16 are referred to using a unique numeral reference, they can of course be different.

Also, while the storing positions 14 registered with the LEDs 12 are illustrated as being spaces on shelves 18, they can take any other form allowing to receive products 16, such as spaces on a table (not shown), locations in a container (not shown), etc. There number of such storing positions 14 may of course also vary.

The expression "product" should not be construed herein in any limited way and is intended to include any objects, samples, etc., in any form and packaging.

According to the illustrated embodiment, the LEDs 12 are RGB-type LEDs that are mounted on a series of interconnected strips 20. The LEDs 12 are further addressable. Such strips of addressable LEDs are well-known in the art and will not be described herein in more detail for concision purposes.

The LEDs 12 are coupled to a computer system 22 via a LED controller 23 so as to be controlled thereby.

According to the illustrative embodiment, the LED controller 23 is in the form of a Raspberry Pie computer programmed for controlling the LEDs 12 and configured for Wi-Fi communication with the computer system 22. According to another embodiment, the LED controller 23 is of another type.

The computer system 22 is configured for:
wireless communication with the LED controllers 23 and bar code readers 24;
storing and/or accessing information associated to the plurality of products 16;
allowing the creation and management of lists of selected products among the plurality of products 16 and the storing of such lists.

More specifically, the computer system 22 includes a wireless network adapter or router 25 and is also configured for communication over the Internet and/or over a private network.

Information related to the products 16 are stored locally in the memory of the computer system 22 and/or transferred to a remote system (not shown) through Internet and/or the private network.

The information associated to the products 16 includes a unique address of one of the plurality of addressable LEDs for each of the plurality of products and the storing position associated thereto. Such information may relate to any other aspect of the products, including without limitations its name, origin, distributor, an identification associated thereto, etc.

The computer system 22 further includes a program for managing the product inventory, including a user interface allowing to enter and manage the information related to the products 16. Such a program further allows creating and managing lists of products.

According to the illustrated embodiment, an example of a list of products 16 is an order.

In the more specific example of the products 16 being drug bottles and containers, a list of selected products is for example:
a list of drugs to recover for a specific patient/client;
a list of drugs to be returned;
a list of drugs responding to predetermined criteria in an inventory.

Once a list of products 16 is defined, and knowing the addressable LED associated to each product, the system 22 can be commanded to send information indicative of the list of products to the LED controller 23, which causes the LEDs 12 that are associated to the corresponding products from the list to be energized. This is summarized in FIG. 3.

Since the addressable LEDs 12 are of the RGB type, a specific list, or one of the users of the system, can be associated to a specific LEDs color so that more than one person at a time may use the system 10 without confusion as to a specific triggered LED 12 corresponding to which user or list.

The computer system 22 can be further programmed so as to make a selection as to which location to indicate using the corresponding LED 12, in a case when a same product 16, part of the list, can be found at different storing locations 14. The selection can be based on criteria such as, without limitations, the proximity of the storing location, the date of arrival of the corresponding product 16 in the inventory, etc.

Also, in the case of a product being included in more than one active lists, the system 10 is configured so that the corresponding LEDs 12 flashes alternately between the colors associated to each list or user.

According to another embodiment, the LEDs 12 are unicolor and are intended for a single user or to indicate the products from a single list at a time.

The LED controllers 23 are configured for wireless communications with the computer system 22 and, for such a purpose, each are assigned a unique IP (Internet Protocol) address.

To easily trigger the selection of a list in the system database, each list is associated to a unique barcode 28 printed on a sheet 30, the scanning of which serving in the system 22 as a trigger to energize the LEDs corresponding to the products 16 in the corresponding list.

More generally, each unique barcode 28 is used to trigger a predetermined command as programmed in the system 22. Examples of such commands include without limitations, associating a list to a user, starting entering new products in the inventory, verifying parts or all of the inventory, etc.

The unique barcodes 28 are not limited to be printed on a sheet 30. Alternatively, or additionally, the barcode 28 can be displayed on a portable computer, a tablet or portable phone (not shown) and an application is provided to receive such code 28 from the computer system 22 for display. The bar code 28 can also be sent via SMS (short text message) or email. Of course, in such a case, both the computer system 22 and portable are configured for such communication.

Alternatively, or additionally, the energizing of LEDs 12 associated to products 16 in a selected list can be triggered by a command accessible via the user interface or by a control button on a console coupled to the computer system 22 (both not shown).

The barcode scanners 24 are coupled to the computer 22 for wireless communication therewith.

The scanners 24 further allow scanning the barcodes 26 on a product 16 for verifying its selection in a list or for its entry therein. Scanning said barcode 26 causes the triggering of the LEDs associated to the selected product. Correctness of the selection is then confirmed when the LED that is triggered is the one registered with the selected product.

While a single numeral reference is used to identify the barcode 26, they are different for each different product so as to allow uniquely identifying the corresponding product.

The computer system 22 is further configured so that, once a series of LEDs 12 that corresponds to as specific list is triggered, the user can scan each corresponding product before its pick up and wait for a confirmation as to the correctness of the selection, and this before actually picking up the product 16. The confirmation feedback can be in the form for example of the corresponding LED 12 momentarily flashing and/or changing its color. This allows preventing a user picking up a wrong product that would have been misplaced for example.

In the context for example of the system 10 being implemented in a pharmaceutical laboratory, a barcode scanner 24 can be conveniently incorporated in the picking basket (not shown) that is typically used to gather the products 16 corresponding to a prescription (list).

In addition to allowing managing products order as described hereinabove, the system 10 can be configured to create, verify or update an inventory.

The system 10 is further configured with an inventory mode that allows adding a product 16 in the inventory and associating it to the position associated to a LED 12. This can be achieved by sequentially scanning in a predetermined order the barcodes 26 of the products 16 registered with the LEDs 12. The system 10 is configured to allow a same product 16 to be associated to a plurality of LEDs and positions.

The system 10 can be further or alternatively configured to assign product positions by moving a virtual cursor via commands that can be triggered by reading predetermined barcodes on a sheet 30. The subsequent reading of the barcode 26 on a product 16 then automatically creates an association between the product 16 and the corresponding position on the shelves 18. This inventory creation and/or management method can be especially useful when the system 10 does not include a central computer 22. In order to speed up the localization process with the virtual cursor, a plurality of localization landmarks (not shown) can be provided on the shelves 18 to act as starting points in moving the virtual cursor.

According to still another embodiment, push buttons 32 or other physical triggering system are provided on the shelfs 18 to move the virtual cursor along the addressable LEDS 12. According to such an embodiment, each LED 12 is lit when it corresponds to the position of the virtual cursor. Examples of other triggering systems include a personal computer, a smartphone, portable computer, a remote-control device, etc. (not shown).

The system 10 allows accommodating products/containers of different sizes by associating to each LED 12 a product that is centered therewith.

A person skilled in the art would now appreciate that a quick identification of all inventoried products can be achieved by triggering the LEDs 12 associated to all products 16 in the inventory, wherein products associated to untriggered LEDs are not part of the inventory. The same can be achieved for any products 16 corresponding to selected criteria.

Similarly, the system 10 allows readily verifying the correct position of a product in the storage area by scanning its barcode 26, a correctly positioned product being identified by the triggering of the physically associated LED 12.

According to another embodiment, a further verification can be done by scanning a barcode 26' that is provided on the shelf 18, and that is registered with the storing position 14 assigned to a specific product 16. The barcode 26' on the shelf 18 corresponds to the one on the product 16 so that the correctness of the position of the later can be assessed.

The computer system 22, LED controllers 23 and barcode scanners 24 are configured for anyone or a combination of RF (radio frequency), WI-FI, Bluetooth communications or similar.

A further illustrative embodiment of a system for order and inventory management will now be described. According to such an embodiment, each or some of the LED controllers 23 are configured to play the same role than the computer system 22 as described with reference to the first illustrative embodiment. According to this second embodiment, the LED controllers 23 receive commands directly from the scanner 24 or through other means and act upon these commands without any communication with the computer system 22. They further store information related to the lists and product positions in their memory. Such information can be limited to their associated products 16 and LEDS 12, or be duplicated in a plurality of LED controllers 23.

According to another similar embodiment, the use of a computer system 22 is omitted and one or more LED controllers 23 allow managing orders and inventory on its/their own as described hereinabove.

It is to be noted that many modifications could be made to the system 10 described hereinabove and illustrated in the appended drawings. For example:

- in addition, or alternatively to their pairing with a product storing position, each LED located at a predetermined position in the product storing area can be used as a locating and reference position thereon;
- a portable device (not shown) coupled to the computer 22 can be provided which allows the user accessing the lists of products 16 to gather in the storage area. More generally, such a portable device can be used to access some or all of functionalities of the computer system 22;
- other identification than barcodes 26 can be associated to each product to contribute easing its identification. For example, RFID (Radio Frequency Identification) tags, or a series of characters can also be used. Also, the form of such identification can be different than the form of the code use to represent a list;
- other elements than barcodes 28 can be used to trigger the LEDs associated to a specific list or to request from the computer system 22 the list(s) assigned to a user. Such means can be in the form of a personal computer, a smartphone, portable computer, a remote-control device, etc. (not shown). Such device can be portable and/or provided for example near the storage area or on the storage means;
- one or more RFID tags (not shown) or other identification elements can be provided in product-collecting baskets, or more generally carried by the users, to cause the automatic trigger of LEDs 12 associated to a selected list of products or the display of a list-identifying barcode 28 when the user reaches the storage area or is near a scanner;
- the bar code readers 24 can be networked, for example by assigning a unique IP address thereto. This allows for example their assignation to a specific user and related tracking;
- the computer system 22 is not limited to wireless communication with the addressable LEDs 12 and/or bar code reader 24, which can be wired thereto.

The expression "computer system" should be used herein broadly so as to include any information processing unit, such as a general controller, a personal computer, a smartphone, etc. that includes or is coupled to a data storing unit (not shown).

Although a system and method for inventory and order management have been described hereinabove by way of illustrated embodiments thereof, it can be modified. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

What is claimed is:

1. A method for identifying a list of products in an inventory storing area, each product including an identification code, the method comprising:
   i) providing a plurality of addressable LEDs (Light-Emitting Diode), each positioned adjacent a storing position in the storing area;
   ii) coupling the plurality of addressable LEDs to at least one controller that has access to information relative to the products, said information including the identification code for each of the products;
   iii) associating in the at least one controller each of the products in the inventory to one of the addressable LEDs;
   iv) identifying in the storing area products from the list by energizing the addressable LEDs associated thereto, resulting in a plurality of identified products; and
   v) verifying an identity of each of the identified products by reading and comparing the identification code thereof to the identification code associated to the corresponding addressable LED;
   wherein iii) associating in the at least one controller each of the products in the inventory to one of the addressable LEDs including: a) moving a virtual cursor along the plurality of addressable LEDs and energizing a selected one of the plurality of LEDs that corresponds to the virtual cursor, b) for each position of the addressable LEDs that is associated to one of the storing positions that includes one of the products therein, c) reading the identification code of said one of the products, resulting in a read identification code, and d) associating the read identification code to said position of the addressable LEDs that is associated to one of the storing positions that includes one of the products therein.

2. The method as recited in claim 1, wherein the corresponding addressable LED is energized so as to produce a confirmation feedback when said identification code thereof is identical to the identification code associated to the corresponding addressable LED.

3. The method as recited in claim 1, wherein the identification code is a barcode.

4. The method as recited in claim 1, wherein the plurality of addressable LEDs are RGB-type LEDs; the list of products being associated to a selected colour of the addressable LEDs; whereby in iv) the addressable LEDs associated to the products from the list are energized so as to trigger the selected colour.

5. The method as recited in claim 1, wherein the list of products is identified by a unique code.

6. The method as recited in claim 1, further comprising associating an operation related to the list of products to a unique command code; whereby providing the unique command code to the at least one controller causes the at least one controller to perform said operation.

7. The method as recited in claim 6, providing the unique command code to the at least one controller is achieved using at least one of a remote control, a portable device, and an input device connected to the at least one controller.

8. The method as recited in claim 6, further comprising the at least one controller reading the unique command code using a code reader coupled to the at least one controller.

9. The method as recited in claim 6, wherein the unique command code and the identification code are both barcodes that can be read using a barcode scanner that is coupled to the at least one controller.

10. The method as recited in claim 1, wherein the identification code is a first identification code that is on each product; the method further comprising providing a second identification code for each of the products adjacent the storing position thereof;
   whereby the identity of each of the identified products is further verifiable by reading and comparing the first and second identification codes thereof.

11. The method as recited in claim 1, wherein in a) moving a virtual cursor along the plurality of addressable LEDs is achieved by reading a command code using a code reader.

12. A system for identifying a list of products in an inventory storing area, each product including a first identification code, the system comprising:
   i) a plurality of addressable LEDs (Light-Emitting Diode), each having a unique address, and being for positioning adjacent a storing position in the storing area;
   ii) at least one code reader adapted for reading the first identification codes;
   iii) at least one controller that is configured for performing the following tasks:
   a. coupling to the plurality of addressable LEDs;
   b. coupling to the at least one reader;
   c. accessing information relative to the products; said information including the first identification code for each of the products and unique addresses of the addressable LEDs;
   d. pairing each product in the inventory to one of the addressable LEDs;
   e. allowing managing the list of products and the inventory;
   f. energizing the addressable LEDs associated to products from the list, resulting in a plurality of identified products in the storing area; and
   g. comparing a second identification code read by the code reader on a selected one of the identified products to the first identification code associated to the addressable LED corresponding thereto; whereby, the correct position of the selected one of the identified products in the storing area confirmed by both the first and second identification codes being identical, and said addressable LED corresponding thereto being energized in response thereto so as to produce a confirmation feedback;
   wherein d) pairing each product in the inventory to one of the addressable LEDs including:
   d1) moving a virtual cursor along the plurality of addressable and energizing a selected one of the plurality of addressable LEDs that corresponds to the virtual cursor;
   for each position of the addressable LEDs that is associated to one of the storing positions that includes one of the products therein,
   d2) reading the first identification code of said one of the products, and
   d3) associating the first identification code to said position of the addressable LEDs that is associated to one of the storing positions that includes one of the products therein.

13. The system as recited in claim 12, wherein the at least one controller includes a plurality of controllers.

14. The system as recited in claim 13, wherein each of the plurality of the controllers is configured to perform all of the tasks.

15. The system as recited in claim 13, wherein one of the plurality of controllers is a main controller and at least one of the plurality of controllers are LED controllers; each of the LED controllers being coupled to the main controller and to at least some of the addressable LEDs; wherein the tasks "a", and "f" are performed by the LED controllers and the tasks "b", "c", "d", "e" and "g" are performed by the main controller.

16. The system as recited in claim 12, wherein the second identification code is a barcode; the code reader being a barcode scanner.

17. The system as recited in claim 12, wherein the addressable LEDs are RGB-type LEDs.

18. The system as recited in claim 17, wherein the list of products is associated to a selected colour of the addressable LEDs so that in "f" the addressable LEDs associated to the products from the list are energized so as to trigger the selected colour.

19. The system as recited in claim 18, wherein the list of products is part of a plurality of lists, each associated to a different colour of the addressable LEDs.

20. The system as recited in claim 19, wherein in "f", when a same product is part of more than one of the plurality of lists, said energizing the addressable LEDs associated to products from the list includes flashing a LED associated to the same product between the colors associated to said more than one of the plurality of lists.

21. The system as recited in claim 12, wherein the addressable LEDs are mounted to at least one interconnectable strip.

22. The system as recited in claim 12, wherein managing the list of products includes creating the list of products.

23. The system as recited in claim 12, wherein the at least one controller, the at least one reader and the plurality of addressable LEDs are configured for wireless communication.

24. The system as recited in claim 23, wherein the at least one controller includes a main controller and at least one LEDs controller wirelessly coupled to the main controller; the addressable LEDs being wirelessly coupled to the main controller via the at least one LEDs controller.

25. The system as recited in claim 12, wherein the list of products is identified by a list code.

26. The system as recited in claim 25, wherein the at least one code reader is a barcode scanner; the list code is a barcode that is readable by the barcode scanner;
   wherein the list of products is entered in the at least one controller by reading the list code with the barcode scanner.

27. The system as recited in claim 12, wherein in d1) moving a virtual cursor along the plurality of addressable includes reading a command code using the at least one code reader.

* * * * *